United States Patent [19]
Mantha

[11] Patent Number: 6,137,487
[45] Date of Patent: *Oct. 24, 2000

[54] METHOD AND APPARATUS FOR MANIPULATING GRAPHICAL OBJECTS IN A DATA PROCESSING SYSTEM

[75] Inventor: Murthy Lakshmana Mantha, Austin, Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/806,230

[22] Filed: Feb. 24, 1997

[51] Int. Cl.$^7$ .................................. G06F 9/00; G06F 3/00
[52] U.S. Cl. ........................... 345/333; 345/145; 345/339
[58] Field of Search ...................................... 345/145, 173, 345/354, 348, 349; 382/187, 145, 173, 326, 334, 339, 348, 349, 351–54, 357

[56] References Cited

U.S. PATENT DOCUMENTS

| | | | |
|---|---|---|---|
| 5,063,600 | 11/1991 | Norwood | 345/173 |
| 5,230,063 | 7/1993 | Hoeber et al. | 345/354 |
| 5,303,388 | 4/1994 | Kreitman et al. | 345/348 |
| 5,436,637 | 7/1995 | Gayraud et al. . | |
| 5,500,936 | 3/1996 | Allen et al. . | |
| 5,517,586 | 5/1996 | Knowlton . | |
| 5,542,024 | 7/1996 | Balint et al. . | |
| 5,559,942 | 9/1996 | Gough et al. | 345/349 |
| 5,574,836 | 11/1996 | Broemmelsiek . | |
| 5,598,183 | 1/1997 | Robertson et al. | 345/145 |
| 5,642,131 | 6/1997 | Pekelney et al. | 345/145 |
| 5,657,050 | 8/1997 | McCambridge et al. | 345/145 |
| 5,682,439 | 10/1997 | Beernick et al. | 382/187 |
| 5,754,179 | 5/1998 | Hocker et al. | 345/348 |
| 5,790,115 | 8/1998 | Pleyer et al. | 345/127 |

OTHER PUBLICATIONS

Anschuetz, et al, "Sliding Tool Bar and Action Bar", IBM Technical Disclosure Bulletin, vol. 39, No. 1, pp. 359–360, Jan. 1996.
Cline, et al, "Window Closing Animations", IBM Technical Disclosure Bulletin, vol. 38, No. 11, p. 13, Nov. 1995.
Bowman, et al, "Interactive Sprite Agent for Contextual Help", IBM Technical Disclosure Bulletin, vol. 38, No. 10, pp. 415–416, Oct. 1995.
Bowman, et al, "Mechanism for Scripting Tutorials for an Interactive Help Sprite Agent", IBM Technical Disclosure Bulletin, vol. 38, No. 10, pp. 229–230, Oct. 1995.

*Primary Examiner*—Raymond J. Bayerl
*Assistant Examiner*—Cao H. Nguyen
*Attorney, Agent, or Firm*—Jeffrey S. LaBan; Duke W. Yee

[57] ABSTRACT

A method and apparatus for providing visual cues for a graphical object displayed in a graphical user interface in a data processing system. The graphical object is displayed in a first state in which the graphical object includes text and a first color. The graphical object is displayed in a second state in response to a pointer being placed or displayed on the graphical object. In the second state, the graphical object is displayed with a second color in place of the first color, and the text has a variation in physical appearance. Additionally, a process for navigating graphical objects is provided in which the pointer is displayed on a graphical object and the pointer moves from one graphical object to another graphical object in response to the manipulation of a pointing device. The pointer, however, clips or jumps from graphical object to graphical object, rather than in a smooth movement in response to manipulation of the pointing device.

38 Claims, 15 Drawing Sheets

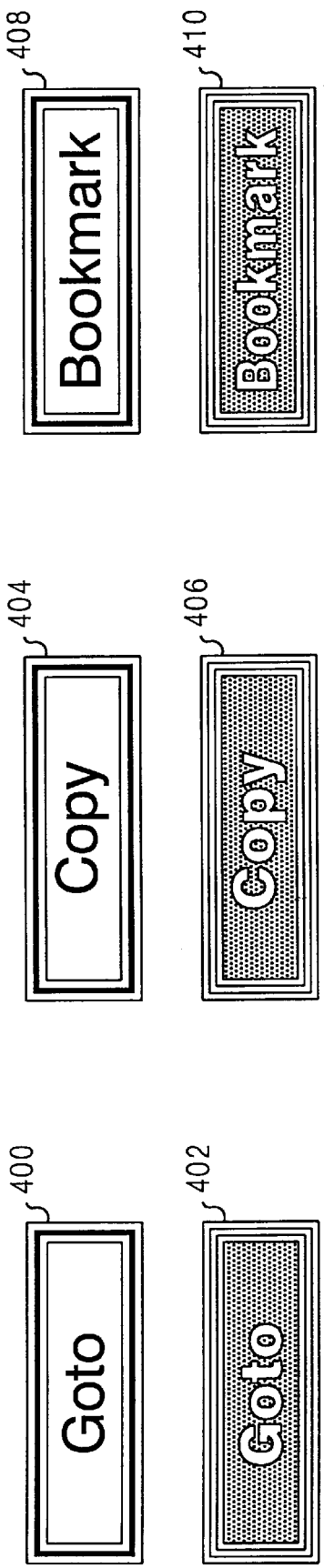
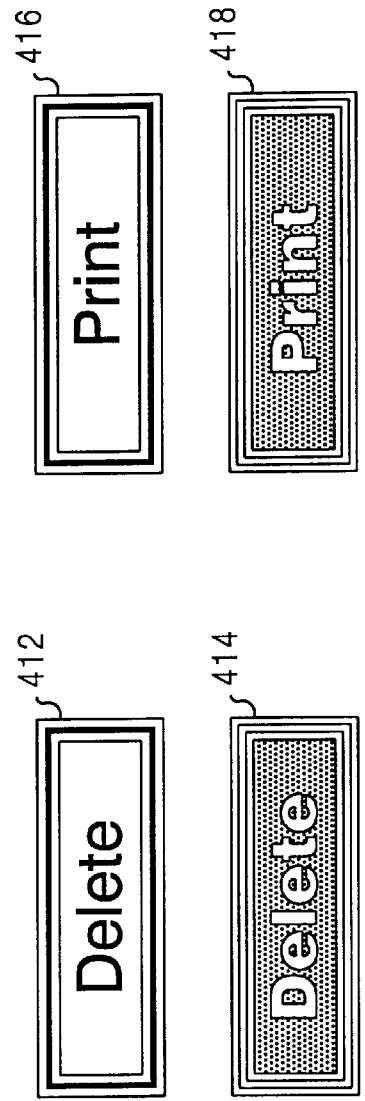
Fig. 4A
Fig. 4B
Fig. 4C
Fig. 4D
Fig. 4E

```
rows = max rows
columns = max columns
For i = 1 to rows, by + 1
    For j = 1 to columns, by + 1
        button number = (i - 1) * columns + j
        If i = 1 then
            next_up [button number] = button number
        else
            next_up [button number] = (button number - columns)
        If i = rows then
            next_down [button number] = button number
        else
            next_down [button number] = (button number + columns)
        If j = 1 then
            next_left [button number] = button number
        else
            next_left [button number] = j - 1
        If j = columns then
            next_right [button number] = button number
        else
            next_right [button number] = j + 1
```

Fig. 7 rows = 3
columns = 5
total number of buttons = 15 next_left(1) = 1; next_right(1) = 2; next_up(1) = 1; next_down(1) = 6
next_left(2) = 1; next_right(2) = 3; next_up(2) = 2; next_down(2) = 7
next_left(3) = 2; next_right(3) = 4; next_up(3) = 3; next_down(3) = 8
next_left(4) = 3; next_right(4) = 5; next_up(4) = 4; next_down(4) = 9
next_left(5) = 4; next_right(5) = 5; next_up(5) = 5; next_down(5) = 10
next_left(6) = 6; next_right(6) = 7; next_up(6) = 1; next_down(6) = 11

• • • next_left(15) = 14; next_right(15) = 15; next_up(15) = 10; next_down(15) = 15

METHOD AND APPARATUS FOR MANIPULATING GRAPHICAL OBJECTS IN A DATA PROCESSING SYSTEM

BACKGROUND OF THE INVENTION

1. Technical Field

The present invention relates generally to an improved data processing system and, in particular, an improved graphical user interface in a data processing system. Still more particularly, the present invention relates to a method and apparatus for manipulating graphical objects in a graphical user interface in a data processing system.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

Using data processing systems to access the internet and in particular the World Wide Web has become an increasingly common use of a data processing system. Typically personal computers (PCs) along with workstations are typically used to access the internet. The largest segment of the consuming public does not currently have access to these resources. The cost and complexity of these types of data processing systems, however, have prevented some consumers from being able to access the internet. Such consumers are typically either unable or unmotivated to acquire both the requisite hardware and software and the necessary computer skills for taking advantage of these resources. A need is present for low cost data processing systems which are simple to operate, allowing users without computer skills the opportunity to access the Internet.

The network computer (NC), internet appliance, web PC, internet access device, browser box, set-top box, etc. are all names for the same concept with minor variations. In particular, the concept is to provide a low cost data processing system that discards over weight operating systems and bloated, platform-specific applications. Instead, many of these new data processing system run a microkernal operating system and platform independent software written in an interpreted language such as Java. In theory, an NC can perform any function a PC does, except it will cost less for the hardware and software. Connectivity costs, however, may differ. To provide an NC, vendors must focus on four technologies, which include low cost, speedy microprocessors, light weight system software and component ware, platform-independent programming languages, and fast affordable access to networks. In addition, the use of NCs would allow for cheaper terminals for large businesses in addition to providing lower cost systems for other users who traditionally do not purchase PCs.

In designing a low cost, simple data processing system, however, it is necessary to presume that the target user is unsophisticated and/or inexperienced. Therefore, the operation of the data processing system must be both simple and intuitive, requiring little or no technical sophistication on the part of the user. In particular, such a system provides a graphical user interface (GUI) to the user. The graphical user interface provides the user with a number of different graphical objects, windows, and message boxes that may be manipulated by the user using a mouse or some other pointing device. For unsophisticated and/or inexperienced users, traversing a window filled with a number of graphical objects may be difficult. Specifically, determining what graphical objects may be selected or moving a pointer manipulated by the mouse to reach selected graphical objects may be difficult and frustrating for unsophisticated and/or inexperienced users. For example, in attempting to select a button in a menu, a user might accidentally select a graphical object within another window while attempting to position the pointer over the correct button. Such a situation may result in undesirable effects, such as launching another application or closing an application, further frustrating the user. Therefore, it would be advantageous to have an improved method and apparatus for manipulating graphical objects in a graphical user interface in a data processing system.

SUMMARY OF THE INVENTION

It is one object of the present invention to provide an improved data processing system.

It is another object of the present invention to provide an improved graphical user interface in a data processing system.

It is yet another object of the present invention to provide a method and apparatus for manipulating graphical objects in a graphical user interface in a data processing system.

The foregoing objectives are achieved as follows: The present invention provides a method and apparatus for providing visual cues for a graphical object displayed in a graphical user interface in a data processing system. The graphical object is displayed in a first state in which the graphical object includes text and a first color. The graphical object is displayed in a second state in response to a pointer being placed or displayed on the graphical object. In the second state, the graphical object is displayed with a second color in place of the first color, and the text has a variation in physical appearance. Additionally, a process for navigating graphical objects is provided in which the pointer is displayed on a graphical object and the pointer moves from one graphical object to another graphical object in response to the manipulation of a pointing device. The pointer, however, clips or jumps from graphical object to graphical object, rather than in a smooth movement in response to manipulation of the pointing device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 4A–4E are illustrations of graphical objects in a form of buttons that may be selected in a normal mode and a highlighted mode according to the present invention;

FIG. 7 depicts a diagram of pseudo code for defining adjacent graphical objects according to the present invention;

DETAILED DESCRIPTION OF THE PREFERRED EMBODIMENT

Figure 1A:
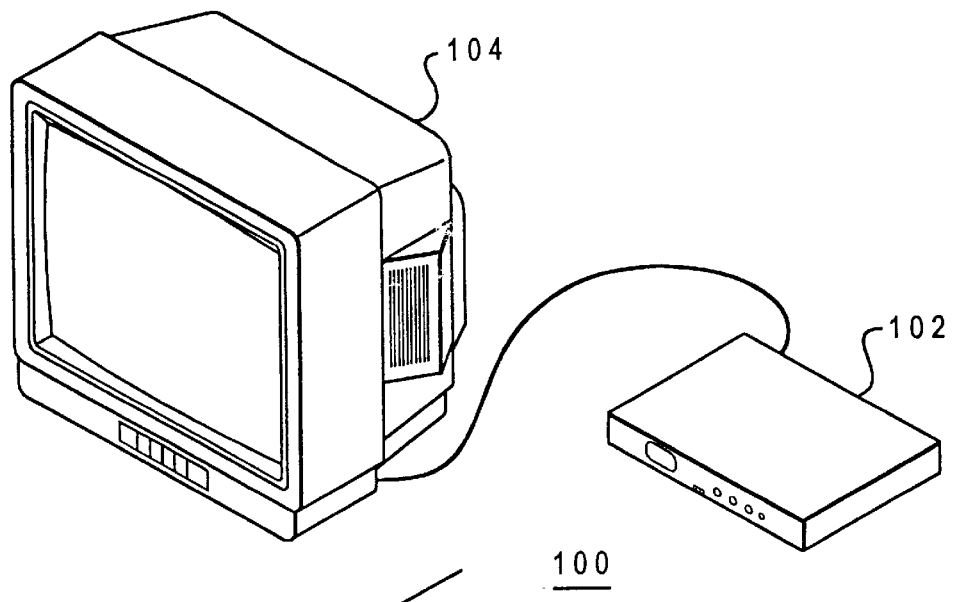
FIGS. 1A–1D depict various representations of a data processing system in which the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as serving as an answering machine or receiving facsimile transmissions.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1D:
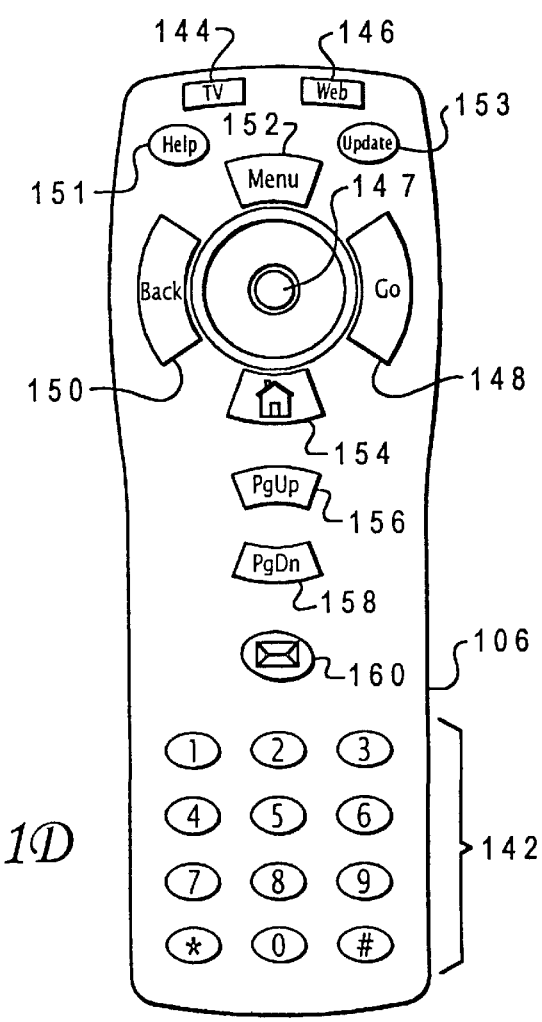
Figure 1B:
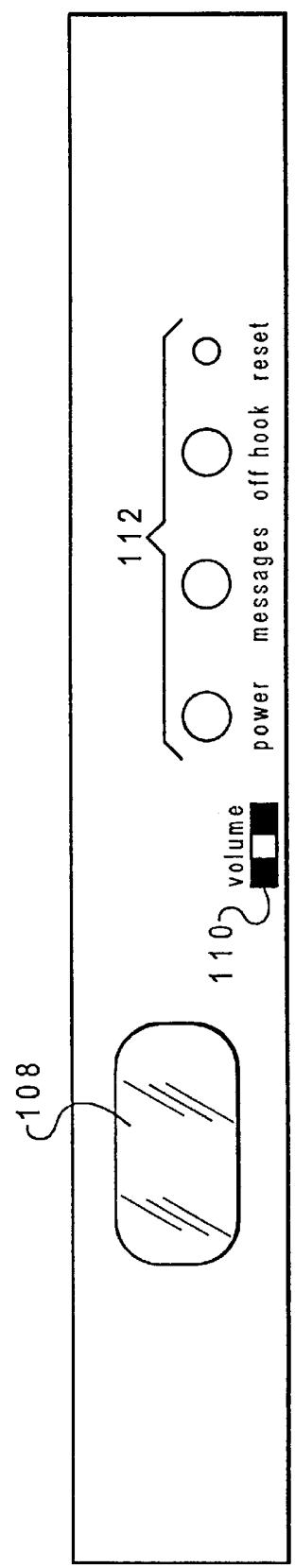

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
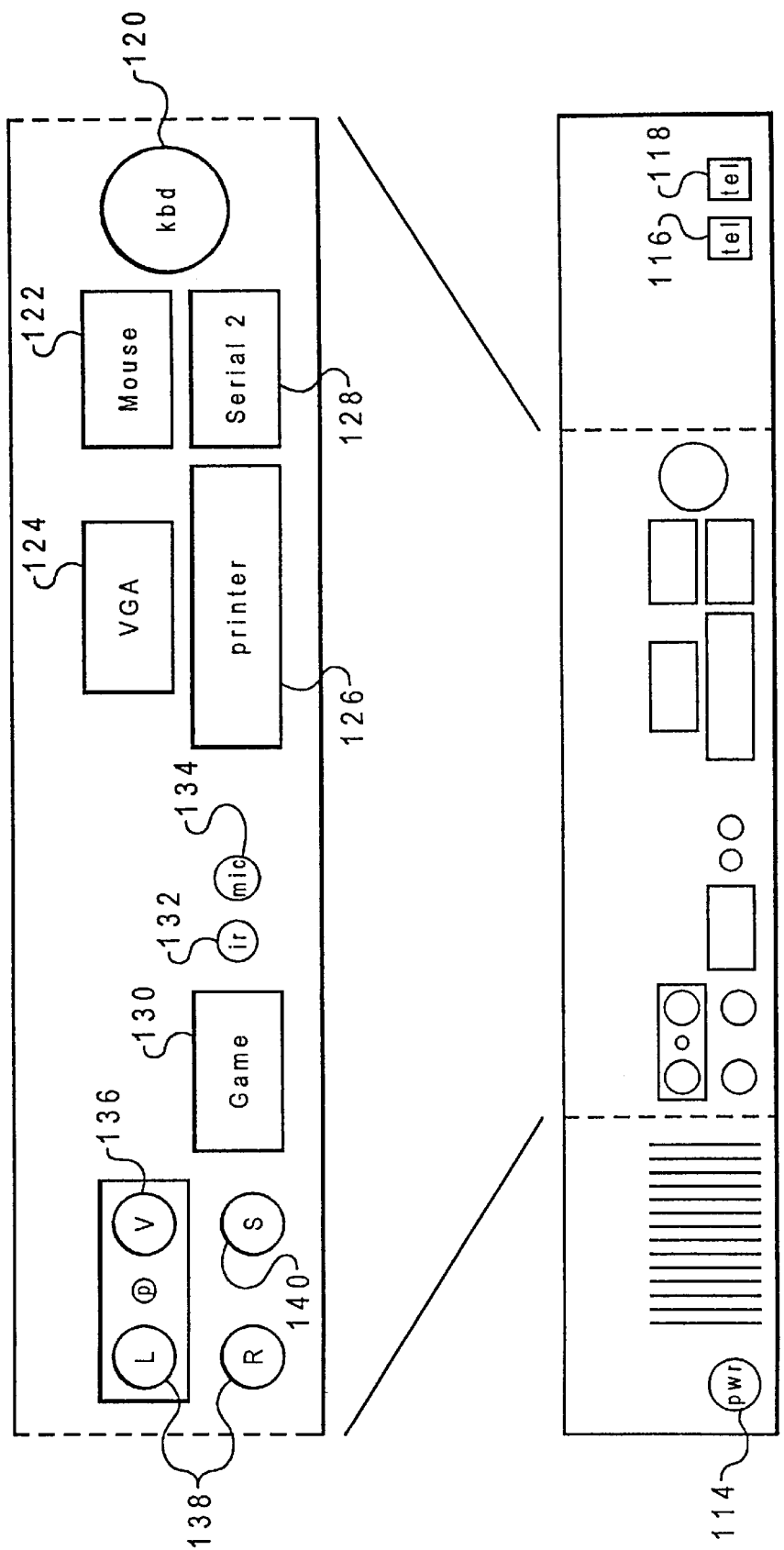

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
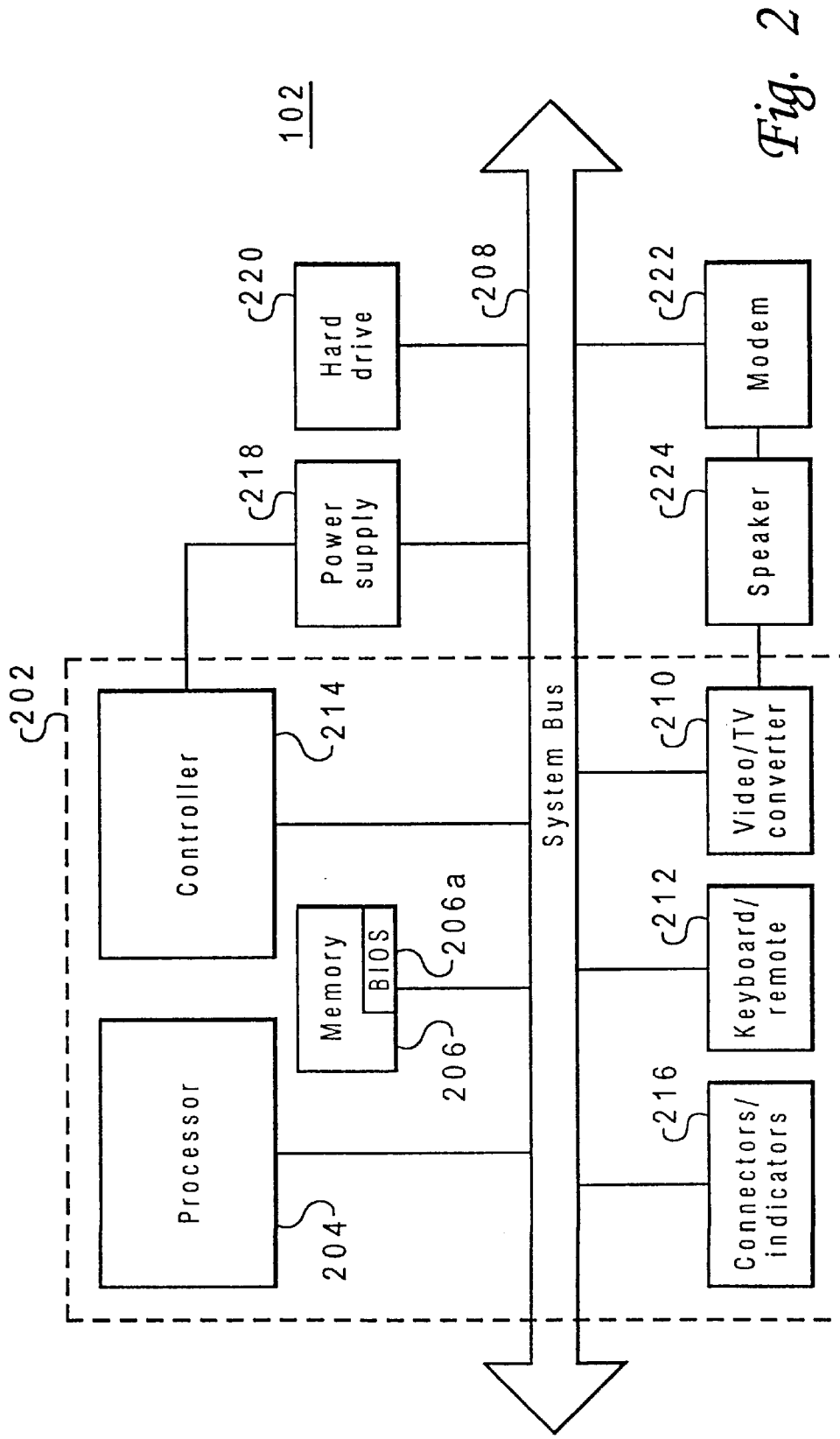
FIG. 2 is a block diagram of components within the data processing system illustrated in FIGS. 1A–1D according to the present invention.

Referring now to FIG. 2, a block diagram for the major components of data processing unit 102 according to the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1-5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shut off data processing unit 102 and signals that service is required through indicators 216. Thus data processing unit 102 is capable of self-recovery without involvement by a user.

Controller 214 also receives and processes input from infrared remote control 106, infrared keyboard, wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

The term "mouse," when used in this document, refers to any type of operating system supported graphical pointing device including, but not limited to: a mouse, track ball, touch pad, light pen, touch screen, and the like. A pointing device typically is employed by a user of a data processing system to interact with the data processing system's graphical user interface. A "pointer" is an iconic image controlled by a mouse or other such device, and is displayed within the GUI on the video display device of the data processing system to visually indicate to the user icons, menus, buttons, or the like that may be selected or manipulated. In the situation in which the pointing device is a mouse, the pointer is moved by moving the mouse over a flat surface in the desired direction of movement of the pointer. Thus, the two-directional movement of the mouse on a flat surface translates into a corresponding two-dimensional movement of the pointer on the video display.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3A:
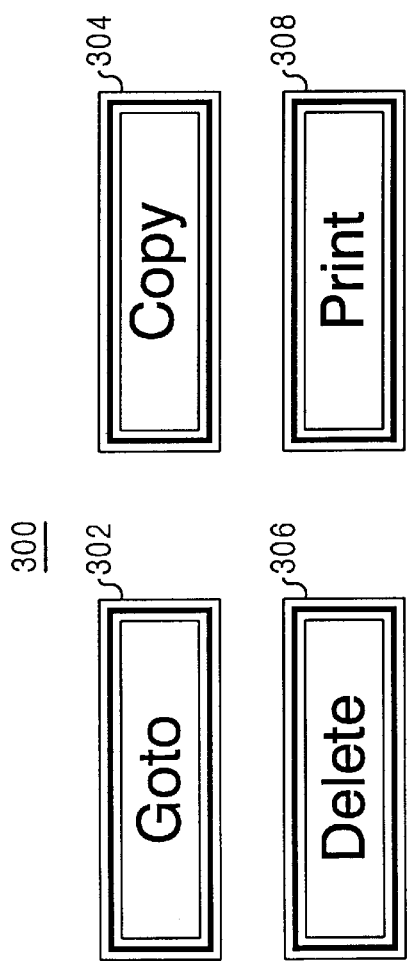
FIGS. 3A and 3B depict a diagram of a menu with buttons according to the present invention.
Figure 3B:
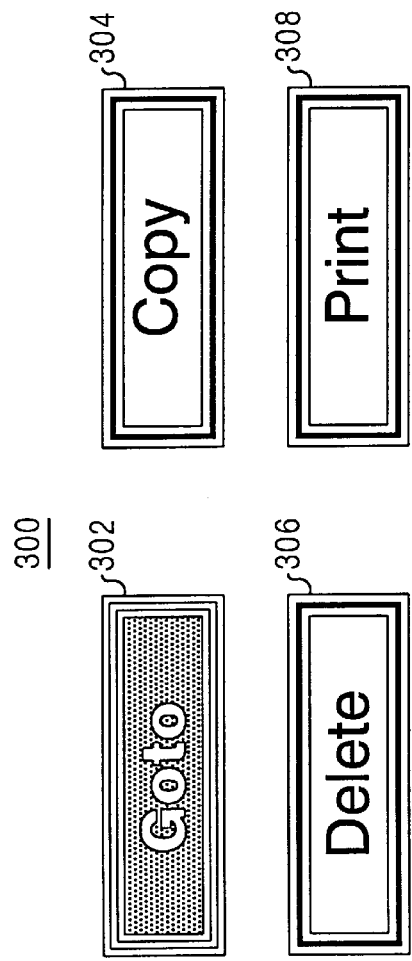

With reference now to FIGS. 3A–3B, a diagram of a menu with buttons is depicted according to the present invention. In many programs, when a user presses a selected key on the keyboard or provides some other selected input, a menu containing an array of buttons is presented to the user in the graphical user interface. With reference to FIG. 3A, a menu 300 is displayed with buttons 302, 304, 306 and 308. These buttons provide various features. Button 302 is a "Goto" button, button 304 is a "Copy" button, button 306 is a "Delete" button, and button 308 is a "Print" button. As the pointer is moved over these buttons, the current button on which the pointer lies is indicated in the depicted example by visual cues. In FIG. 3B, button 302 is displayed using a different bit map in which the color has changed for a highlighted state. The legend "Goto" has a variation in position and is indicated in handwriting. This variation of the text in the legend is a physical variation from the first bit map in contrast to merely a change of color in the text. The visual cues include a change of color, a change of text size and position of the legend for the button, and the use of handwritten text in the legend. The term "legend" refers to text that is displayed in association with a graphical object. The change of color may be implemented using two bit maps to represent the selected and normal states. For example, white text and a border on black background may be used for a normal state, while cyan or other contrasting color for text and border on black for a highlighted state. The change of text size and position may be implemented by a different font or, in the case of the depicted example in FIGS. 3A and 3B, the text is changed in position and size by handwriting the same legend in about the same positions in both normal and highlighted states. The use of the term "handwriting" or "handwritten" in this document refers to text generated by a user or programmer, in contrast to a computer-generated font. The natural variation in the handwriting provides animation in the button. Alternatively, the text may change from that of a machine-generated font to handwritten text.

With reference now to FIGS. 4A–4E, graphical objects in the form of buttons that may be selected are depicted in a normal mode and a highlighted mode according to the present invention. The normal mode is represented by a first bit map, while the highlighted mode is represented by a second bit map of the button. For example, in FIG. 4A, bit map 400 represents a normal mode for a Goto button. As can be seen, bit map 400 contains handwritten text. Bit map 402 is a highlighted mode for the Goto button. As can be seen, the legend "Goto" has been handwritten. It is slightly different from the legend "Goto" in bit map 400. Changing the display in the GUI from bit map 400 to 402 provides animation in the text. Additionally, bit map 400 is displayed in white text and with a white border on a black background for a normal state. In the highlighted state, bit map 402 is displayed using a color such as cyan or some other contrasting color for the text and border relative to the black background.

Next, in FIG. 4B, bit map 404 illustrates a "Copy" button in a normal mode and bit map 406 shows the same "Copy" button in a highlighted mode. Bit map 408 shows a normal mode, while bit map 410 shows a highlighted mode for a "Bookmark" button. In FIGS. 4D and 4E, bit maps 412 and 416 illustrate a normal mode for a "Delete" button and a "Print" button, respectively. Bit maps 414 and 418 show the highlighted mode of these buttons.

Alternatively, additional bit maps may be used to provide further animation by placing letters in a highlighted state one at a time. For example, additional bit maps may be displayed between the time bit map 400 and bit map 402 are shown to a user. For example, a second bit map may be employed in which the letter "G" in the legend is displayed in a contrasting color from the white text in bit map 400. Additionally, the letter "G" also would be changed in size and position. Two other bit maps would be employed in which the letters "o" and "t" are successively displayed in a contrasting color with an altered text size and position in the legend. Other types of animation that also may be employed include displaying a graphical object that changes. For example, a bit map of a folder that is closed may be displayed for normal state with a bit map for an open folder in a highlighted state that would be displayed when a pointer is moved over or displayed on the graphical object.

Although the depicted example illustrates the highlighting of buttons with legends located on the buttons, the present invention may be applied to other graphical objects that may be selected using a pointing device. Additionally, although the depicted examples involve handwritten text, the normal mode of a button or other graphical object could include text that is in the form of a computer-generated font with a different computer-generated font or handwritten text being displayed upon highlighting of the graphical object.

Figure 5A:
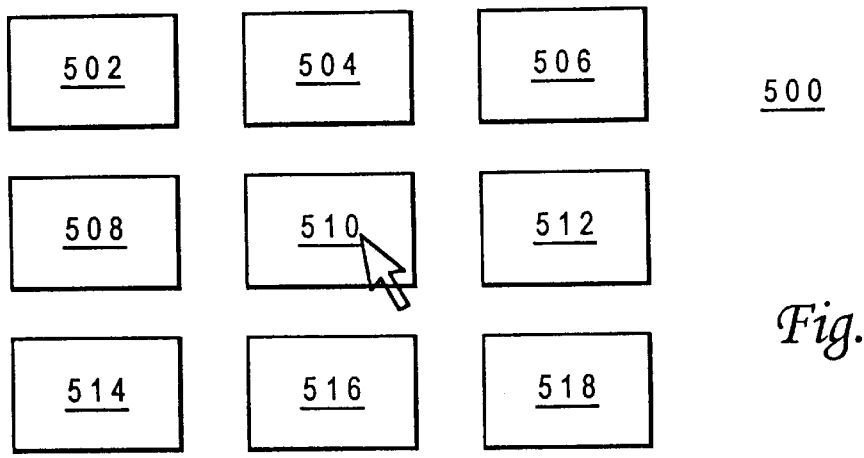
FIGS. 5A–5C depict a diagram of a menu containing buttons to illustrate the movement of a pointer according to the present invention.
Figure 5B:
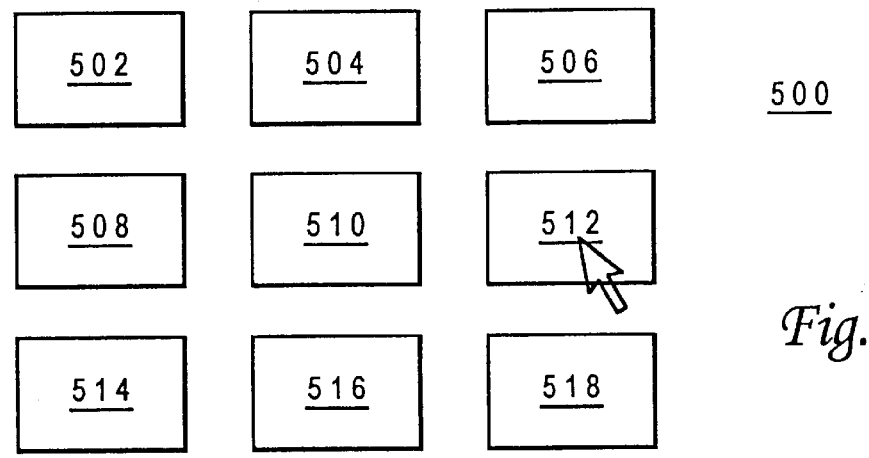
Figure 5C:
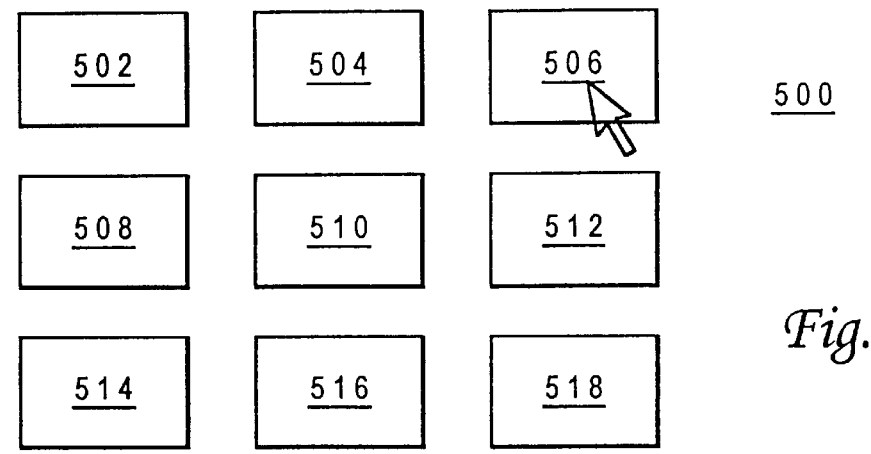

With reference now to FIGS. 5A–5C, a diagram of a menu 500 containing buttons 502–518 are depicted according to the present invention. In this matrix of buttons, moving a pointer to select a highlighted button may be challenging. According to the present invention, when a menu is present for a user to select buttons, the pointer is moved to the center of the button, depending on the user's manipulation of the pointing device. For example, in FIG. 5A, pointer 520 begins centered to button 510. If the user moves the pointing device to the right, typically, pointer 520 would move on the graphic user interface as the user manipulates the pointer to move to the right. According to the present invention, pointer 520 does not move until sufficient manipulation of the pointing device occurs. At that time, pointer 520 would clip to the center of button 512 by clipping, also called jumping, the display of pointer 520 in which pointer 520 jumps from the center of button 510 to the center of button 512. From that point, if the user were to manipulate the pointing device to move the pointer in an upward direction, pointer 520 would remain at the center of button 512 as illustrated in FIG. 5B, and would "clip" to button 506 as shown in FIG. 5C when sufficient movement of the pointer in the upward direction has occurred. Thus, pointer 520 would jump from the centers of each button depending on the user's movement. This clipping or jumping would reduce the dexterity challenges of selecting a button from a menu. Additionally, having the pointer move from button to button by clipping the movement rather than providing the normal smooth movement of the pointer also would prevent a user from accidentally selecting graphical objects within another window. Alternatively, pointer 520 could be moved within button 510 to the edge of button 510, and then would jump to button 512 when sufficient movement to the right by the pointing device had occurred before jumping the pointer to button 512. This type of jumping or clipping movement is in contrast to the presently provided movement of the pointer between buttons in response to movement of a mouse. In this manner, when the user moves the mouse, the pointer appears to stick to the center of the button and the legend on the button animates slightly. In response to additional movement of the mouse based on the direction, the pointer jumps to the next button and sticks to its center. Simultaneously, the previous_button shows a normal state and the new_button, the selected_button, is highlighted. Due to the natural variations in the handwritten text used in the legends on the buttons, the legend appears to user to dance or animate, as an additional visual cue to the user. By placing the pointer to the center of the button, this placement aids in prompting the user to take some action with respect to the buttons in the menu displayed in the graphical user interface.

Figure 6A:
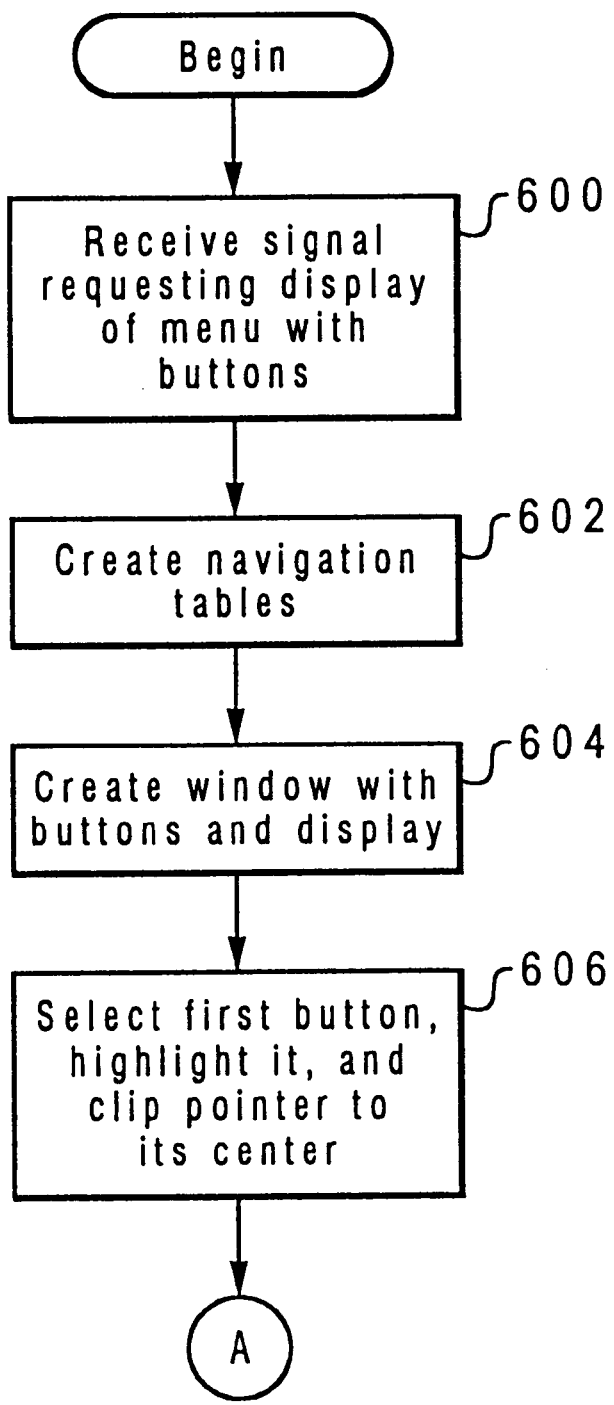
FIGS. 6A–6C are a flowchart of a process for highlighting and moving a pointer according to the present invention.
Figure 6B:
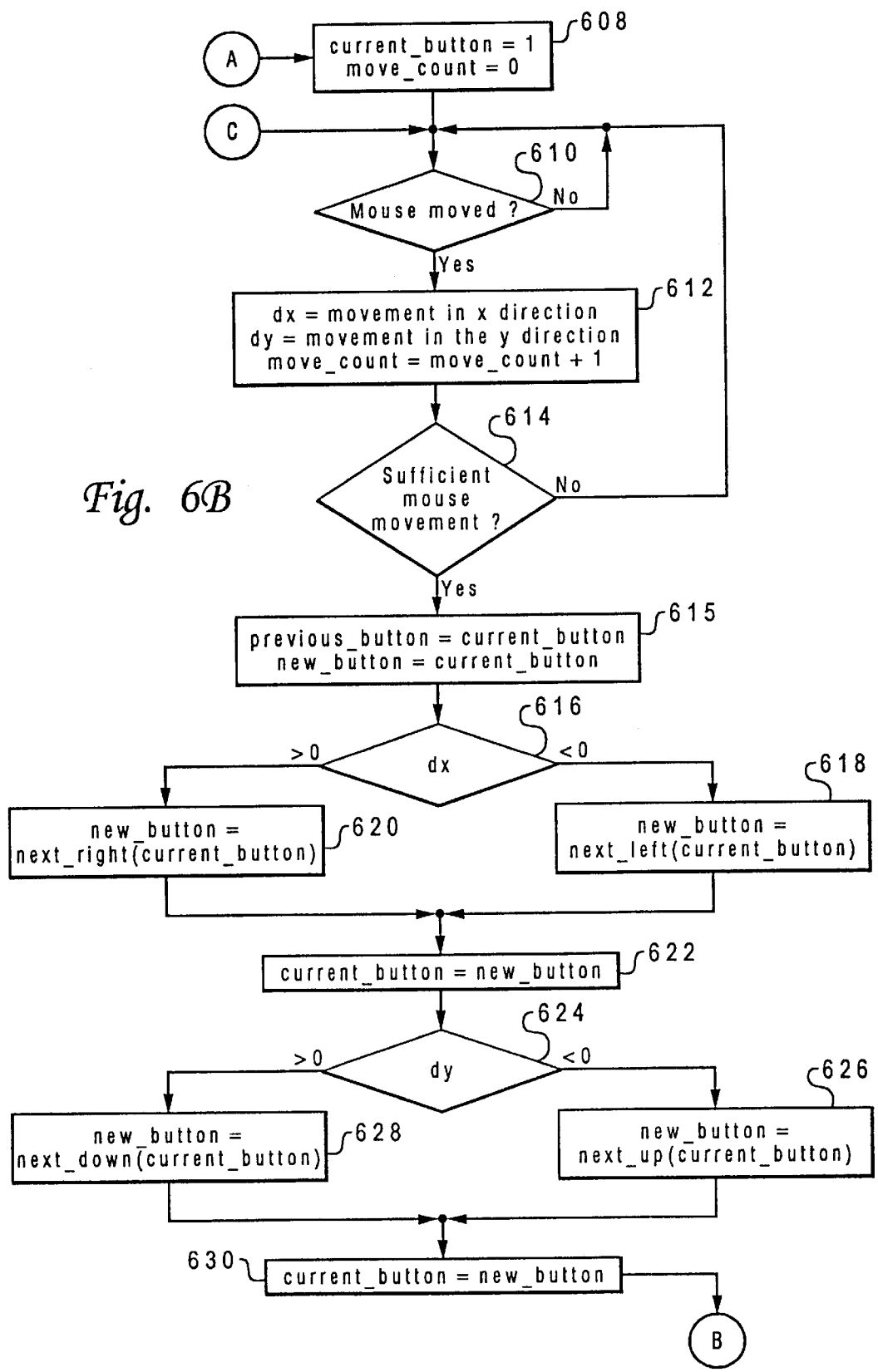
Figure 6C:
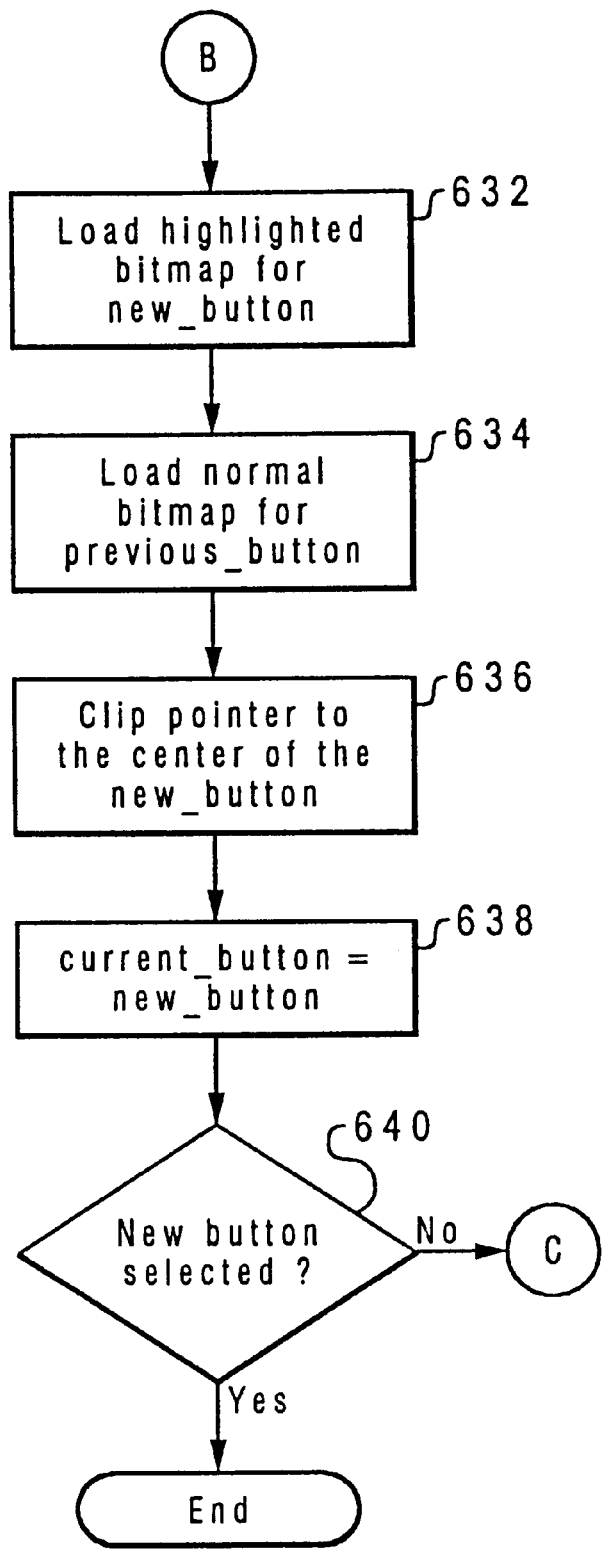

With reference now to FIGS. 6A–6C, a flowchart of a process for highlighting and moving a pointer is depicted according to the present invention. The process begins by receiving user input or some other signal indicating that a menu of buttons should be displayed to the user (step 600). Next, navigation tables are created for moving the pointer from button to button (step 602). Alternatively, step 602 may be performed prior to the processes depicted in FIGS. 6A–6C. The process then creates a window with buttons and displays them in the graphical user interface in response to a signal indicating that a menu should be displayed (step 604). The process then selects the first button and then (a) highlights the button and (b) clips the pointer to the center of that button (step 606). This first button is the current button, and the variable current_button is then set equal to one and the variable move_count is set equal to zero (step 608). The variable current_button identifies the button that is to be highlighted, and the variable move_count is employed to identify the number of times that movement in the x or y direction has occurred.

Next, a determination is made as to whether the mouse has been moved (step 610). If the mouse has not been moved, the process returns to step 610. Upon movement of the mouse, the variable dx is set equal to the movement in the x direction relative to the center of the button, the variable dy is set equal to the movement in the y direction relative to the center of the button, and move_count is incremented by one (step 612). Then, a determination is made as to whether sufficient mouse movement has occurred (step 614). If insufficient mouse movement has occurred, the process returns to step 610. If a determination that sufficient movement has occurred, the process then sets the variable previous_button equal to current_button and new_button equal to curent_button (step 615). Then, a determination is made as to whether dx is greater or less than zero (step 616). If dx is less than zero, the process then sets the new_button equal to next_left(current_button) (step 618). If dx is greater than zero, then new_button is set equal to next_right(current_button) (step 620). In either event, after the variable new_button has been set, current_button is set equal to new_button (step 622).

Thereafter, a determination is made as to whether dy is greater than or less than zero (step 624). If dy is less than zero, then new_button is now set equal to next_up (current_button) (step 626). If dy is greater than zero, then new_button is set equal to next_down(current_button) (step 628). After the variable new button has been set in either step 626 or step 628, the variable current_button is set equal to new_button (step 630).

Next, the highlighted bit map for the button identified by new_button is 12 loaded and displayed to the user (step 632). Then, the normal bit map for the variable previous_button is loaded (step 634). Thereafter, the cursor is clipped to the center of the new_button (step 636). Then current_button is set equal to the new_button (step 638). A determination is then made as to whether the new_button has been selected (step 640). If the button identified by new_button has been selected, then the process terminates. Otherwise, the process returns to step 610 as described above. According to the present invention, steps 616 through 636 allow for both left and right movement of the pointer and for diagonal movements of the pointer on the graphical user interface.

Figure 8:
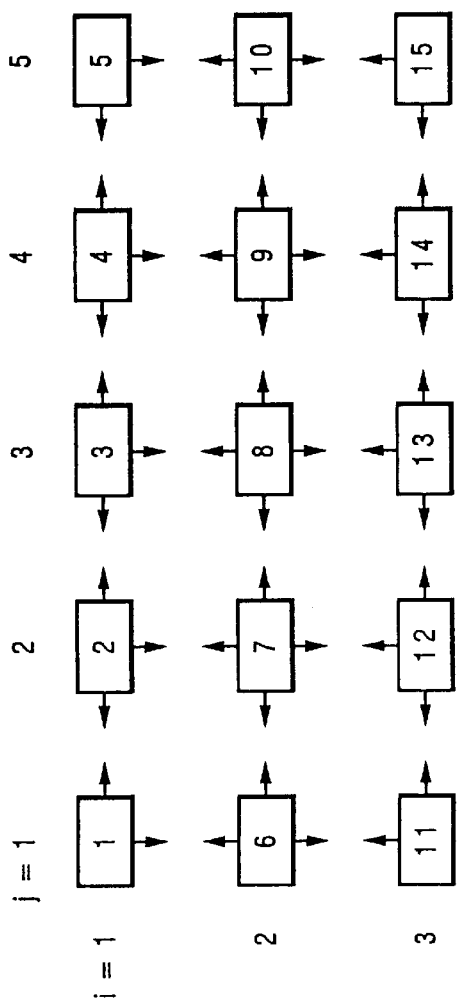
FIG. 8 is an illustration of buttons and a table generated for the buttons using the process illustrated in FIG. 7 according to the present invention.

With reference now to FIG. 7, a diagram illustrating pseudo code for defining neighbors to a button in a menu of buttons in four directions, next left, next right, next up, and next down are depicted according to the present invention. This process creates four tables, with each table defining the next button number in that direction. FIG. 8 depicts an illustration of 15 buttons, buttons 1–15, with a table generated for those 15 buttons using the process illustrated by the pseudo code in FIG. 7. FIGS. 7 and 8 illustrate in more detail the process used to create navigation tables as described in step 602 in FIG. 6A. As can be seen by the table, when a pointer reaches the edge of the button, no further movement past that edge is allowed. The pseudo code in example in FIGS. 7 and 8 are only for illustrative purposes, and not meant to limit the movement of the pointer. For example, when the pointer reaches the edge of the menu, the last button, and continues to move towards that edge, the pointer could be sent to a button on another edge.

Figure 9:
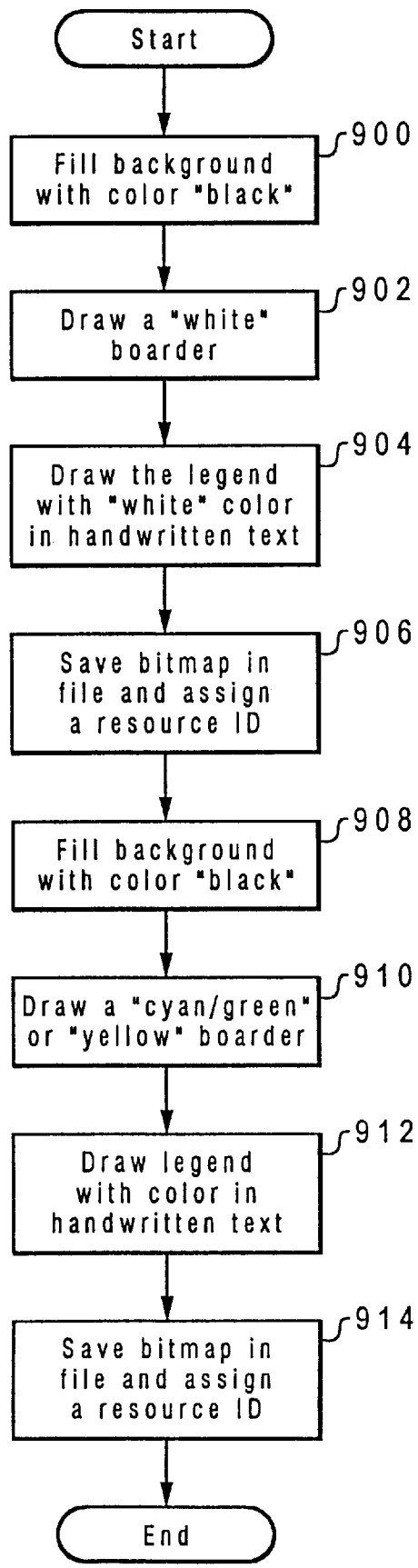
FIG. 9 depicts a flowchart of a process for creating bit maps according to the present invention.

With reference now to FIG. 9, a flowchart of a process for creating bit maps for the buttons displayed in the process in FIGS. 6A–6C is depicted according to the present invention. The process begins by filling in the background with the color black (step 900) and then drawing a white border (step 902) for the button. Thereafter, a legend using handwritten text is drawn with a white color using a mouse or pen on a writing digitizer tablet (step 904). Thereafter, the bit map is saved in a file, and the file is assigned a resource ID (step 906). These steps are employed to create a bit map for a button in the normal state. Next, the same bit map has a background filled with the color black (step 908). Next, a colored border is drawn for the button (step 910). This color may be any color, but preferably is a cyan/green or a yellow border. Next, a legend in handwritten text is drawn with the same color using a mouse or a pen on a writing digitizer tablet in about the same location as the bit map drawn for the button in steps 900–908 above (step 912). Then, the selected state bit map is saved in a different file (step 916) and assigned a resource ID (step 918) with the process terminating thereafter.

Figure 10:
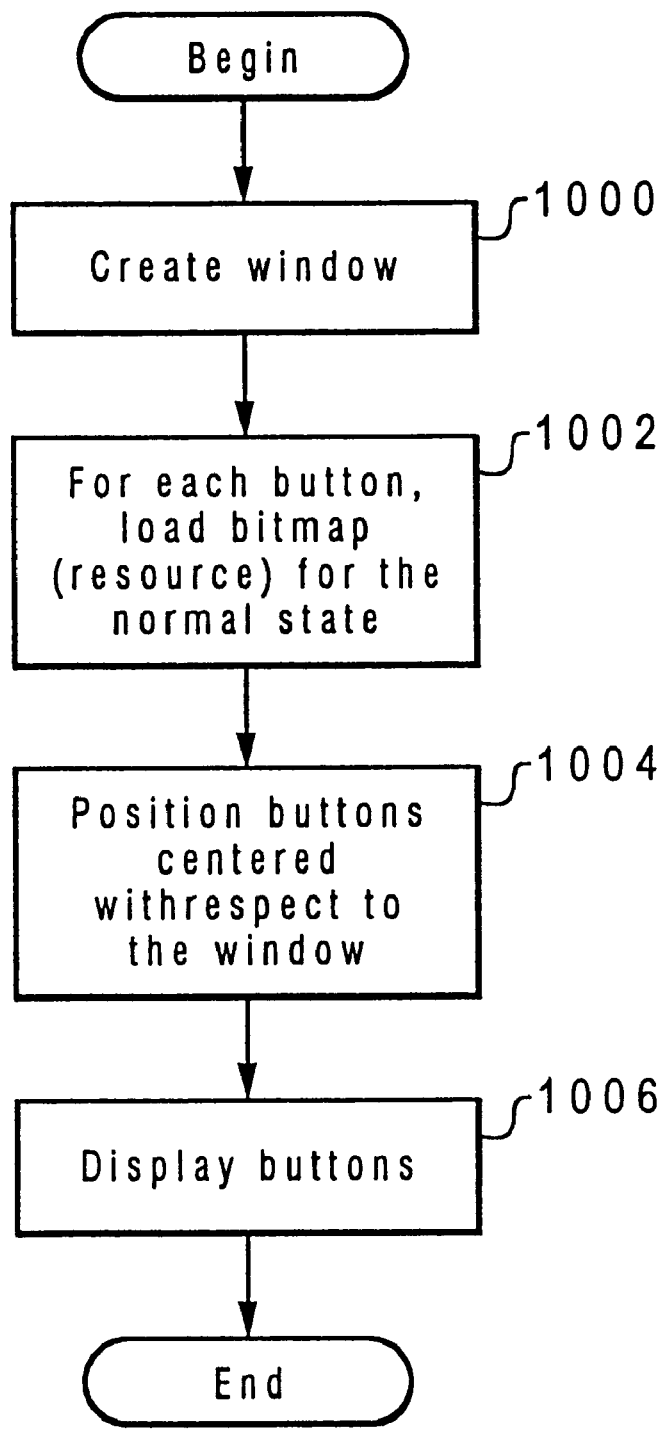
FIG. 10 is a flowchart of a process for creating buttons and a window according to the present invention.

With reference now to FIG. 10, a flowchart of a process for creating buttons in a window is depicted according to the present invention. FIG. 10 is a more detailed description of step 604 in FIG. 6A. The process begins by creating a window in the graphic user interface (step 1000). Thereafter, for each of the buttons a bit map (the resource) is loaded for the normal state (step 1002). Thereafter, the buttons are centered with respect to the window (step 1004) and displayed with the window in the graphical user interface (step 1006).

Figure 11:
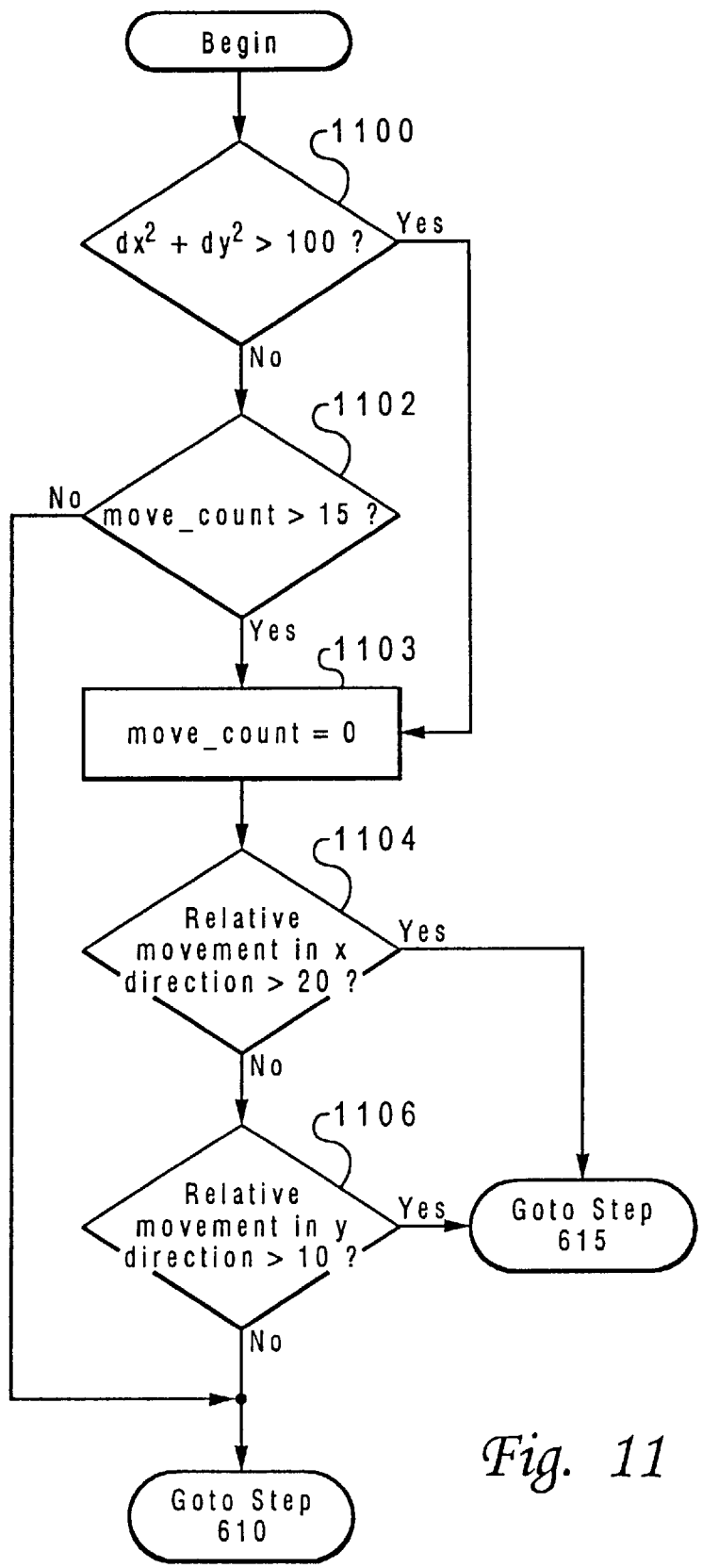
FIG. 11 depicts a process for determining whether sufficient mouse movement has occurred according to the present invention.

With reference now to FIG. 11, a process for determining whether sufficient mouse movement has occurred, is depicted according to the present invention. FIG. 6 is a more detailed description of step 614 in FIG. 6B. The process begins by determining whether the $dx^2+dy^2$ is greater than 100 (step 1100). If the answer to this determination is no, a determination is made as to whether the mouse_count is greater than 15 (step 1102). If the variable mouse_count is not greater than 15, the process then proceeds to step 610 in FIG. 6B. If the mouse_count is greater than 15, then sufficient mouse movement has occurred, and the process proceeds to set mouse_count equal to zero (step 1103). The process also proceeds to step 1103 from step 1100 if $dx^2+dy^2$ is greater than 100. Then, a determination is made as to whether the relative mouse movement in the x direction (absolute value of dx) is greater than 20 (step 1104). If the mouse movement is greater than 20, then sufficient mouse movement has occurred, and the process proceeds to step 615 in FIG. 6B. Otherwise, a determination is made as to whether relative mouse movement in the y direction (absolute value of dy) is greater than 10 (step 1106). If relative mouse movement in the y direction is greater than 10, sufficient mouse movement has occurred, and the process proceeds to step 615 in FIG. 6B. Otherwise, a determination is made that insufficient mouse movement has occurred, with the process returning to step 610 in FIG. 6B.

Steps 616–620 are performed only if relative movement in x direction is greater than 20. Steps 624–628 are performed only if relative movement in y direction is greater than 10. Steps 632–636 are performed only if new_button is different from the previous_button. Steps 1100 and 1102 may be tuned for the sensitivity of the mouse, and steps 1104 and 1106 may be tuned, depending on the size of the button. The values used in FIG. 11 are only for example, and other values may be used for determining whether sufficient mouse movement has occurred. These values are based on the coordinate numbers used in the graphical user interface to move the pointer in response to a movement of the mouse.

The jumping or sticky effect of the movement of the pointer is created by clipping the pointer to the center of the button. Small mouse movements are ignored and movements based on the size of the button may be allowed. More movement may be allowed in larger buttons than in smaller buttons.

The navigational tables described in FIGS. 7 and 8 are defined only for movements left, right, up, and down. For diagonal movements, changes in the x and y directions are combined by processing dx and computing the next button and processing dy and computing the next button as illustrated in step 615 through 630 in FIG. 6.

Additionally, although the depicted example illustrates graphical objects in the form of buttons, visual cues may be provided for other types of graphical objects using changes in color and legends as described above.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

Thus, the present invention provides an improved method and apparatus for navigating graphical objects displayed in a graphical user interface. The present invention provides these advantages through the jumping or clipping movement of the pointer, which reduces the frustration in attempting to select buttons from a menu. Additionally, the visual cues in the form of highlighting and changes in physical appearance of handwritten text provide additional visual cues to the user as to what button the pointer is on and to indicate to the user that such button may be selected. The present invention provides an efficient process for navigating buttons through a creation of tables that are generated to determine on which graphical object the pointer should be displayed in response to movements of a pointing device. In this manner, the present invention reduces frustrations currently present with the normal movement of a pointer, involving displaying a smooth movement of a pointer across a screen.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for displaying a graphical object, the method comprising:

displaying the graphical object in a first state wherein the graphical object in the first state includes text having a first shape, and further wherein the text having the first shape is a handwriting; and displaying the graphical object in a second state, responsive to a pointer being moved over the graphical object, wherein the graphical object in the second state includes text having a second shape in place of the first shape.

2. The method of claim 1, wherein the graphical object in a first state is a first bitmap.

3. The method of claim 2, wherein the graphical object in a second state is a second bitmap.

4. The method of claim 1, wherein the step of displaying the graphical object in a first state occurs in response to an absence of a pointer being displayed on the graphical object.

5. The method of claim 4, wherein the step of displaying the graphical object in a second state occurs in response to the pointer being displayed on the graphical object.

6. The method of claim 1, wherein the graphical object is a button.

7. The method of claim 1, wherein the graphical object in the first state includes a first color; and the graphical object in the second state includes a second color in place of the first color.

8. The method of claim 1, wherein the text of the first state is displayed using a first size; and the text of the second state is displayed using a second size in place of the first size.

9. The method of claim 1, wherein the text of the first state is displayed using a first font; and the text of the second state is displayed using a second font in place of the first font.

10. The method of claim 1, wherein the text of the first state is displayed using a first handwriting; and the text of the second state is displayed using a second handwriting in place of the first handwriting.

11. The method of claim 1, wherein the text of the first state is displayed using a first position; and the text of the second state is displayed using a second position in place of the first position.

12. The method of claim 11, wherein the text of the first state is displayed using a first size; and the text of the second state is displayed using a second size in place of the first size.

13. The method of claim 12, wherein the text of the first state is displayed using a first font; and the text of the second state is displayed using a second font in place of the first font.

14. The method of claim 12, wherein the text of the first state is displayed using a first handwriting; and the text of the second state is displayed using a second handwriting in place of the first handwriting.

15. A method in a data processing system for navigating a plurality of graphical objects, wherein each of the plurality of graphical objects includes at least one legend, and wherein the legend is hand written text and displayed within a graphical user interface using a pointer controlled by a pointing device, the method comprising the data processing system implemented steps of:

clipping the pointer to the first graphical object within the plurality of graphical objects;

displaying the pointer on a first graphical object; and causing the pointer to jump, moving incongruent with respect to control exerted on the pointing device, from the first graphical object to a second graphical object within the plurality of graphical objects in response to a selected amount of manipulation of the pointing device used to move the pointer away from the first graphical object.

16. The method of claim 15, wherein each graphical object within the plurality of graphical objects has normal state and a highlighted state, wherein in the normal state, each graphical object includes a first color and an unaltered legend and in the highlighted state, each graphical objects includes a second color in place of the first color and an altered legend.

17. The method of claim 16, wherein the altered legend and the unaltered legend both include text in which the text in the altered legend has a variation in physical appearance from the unaltered legend.

18. A data processing system for displaying a graphical object, in graphical user interface, the data processing system comprising:

first display means for displaying the graphical object in a first state, wherein the graphical object in the first state includes text having a first shape and further wherein the text having the first shape is a handwriting;

second display means for displaying the graphical object in a second state, wherein the graphical object in the second state, includes text having a second shape in place of the first shape.

19. The data processing system of claim 18, wherein the first display means comprises means for displaying a first bitmap including text and a first color.

20. The data processing system of claim 19, wherein the second display means comprises means for displaying a second bitmap differing from the first bitmap in that text has a second shape in place of the first shape and the first color is replaced with a second color.

21. The data processing system of claim 18, wherein the first display means in responsive to an absence of a pointer being displayed on the graphical object.

22. The data processing system of claim 21, wherein second display means is responsive to a pointer being displayed on the graphical object.

23. The data processing system of claim 18, wherein the graphical object is a button.

24. A data processing system for navigating a plurality of graphical objects, wherein each of the plurality of graphical objects includes at least one legend, and wherein the legend is hand written text and displayed within a graphical user interface using a pointer controlled by a pointing device comprising:

clipping means for clipping the pointer to the first graphical object within the plurality of graphical objects;

display means for displaying the pointer on a first graphical object; and means for causing the pointer to jump, moving incongruent with respect to control exerted on the pointing device, from the first graphical object to a second graphical object within the plurality of graphical objects in response to a selected amount of manipulation of the pointing device used to move the pointer away from the first graphical object.

25. The data processing system of claim 24, wherein each graphical object within the plurality of graphical objects has normal state and a highlighted state, wherein in the normal state, each graphical object includes a first color and an unaltered legend and in the highlighted state, each graphical objects includes a second color in place of the first color and an altered legend.

26. The data processing system of claim 24, wherein the altered legend and the unaltered legend both include handwritten text in which the handwritten text in the altered legend has a variation in physical appearance from the unaltered legend.

27. The data processing system of claim 24, wherein the pointing device is a mouse.

28. The data processing system of claim 24, wherein each graphical object within the plurality of graphical objects has normal state and an active state, and further comprising:

means for changing states of a graphical object in response to manipulation of the pointing device used to move the pointer away from the first graphical object wherein the amount of manipulation is less than the selected amount of manipulation.

29. The data processing system of claim 28, wherein in the normal state, each graphical object includes a first color and an unaltered legend and in the active state, each graphical object includes an animated legend.

30. The data processing system of claim 28, wherein in the normal state, each graphical object includes a first color and an unaltered legend and in the active state, each graphical object includes a second color and an altered legend.

31. The data processing system of claim 28, wherein in the normal state, each graphical object includes a first color and an unaltered legend and in the active state, each graphical object includes a second color and an altered legend.

32. A computer program product for use with a data processing system for displaying a graphical object, in a graphical user interface, the computer program product comprising:

a computer usable medium;

first instruction for displaying the graphical object in a first state, wherein the graphical object in the first state, includes text having a first shape and further wherein the text having the first shape is a handwriting; and second instructions for displaying the graphical object in a second state, wherein the graphical object in the second state, includes text having a second shape in place of the first shape, wherein the instructions are embedded within the computer usable medium.

33. The computer program product of claim 32, wherein the computer useable medium is a hard disk drive.

34. The computer program product of claim 32, wherein the computer useable medium is a floppy disk.

35. The computer program product of claim 32, wherein the computer useable medium is a digital communications link.

36. A method in a data processing system for displaying a graphical object, the method comprising:

displaying the graphical object in a first state wherein the graphical object in the first state includes text having a first origin and set of attributes, wherein the first origin includes at least one of hand written and machine generated; and the attributes include at least one of text color, background color, animation, style, vector format, bit mapped, and transparency;

identifying pointer device movement;

responsive to a pointer device movement, moving a display pointer;

responsive to display pointer movement directed toward the graphical object, changing the first state of the graphical object to a second state:

determining if the display pointer position is on the graphical object; and responsive to the display pointer position on the graphical object and responsive to a pointer device movement, changing the state of the graphical object to the third state; and displaying the graphical object in a third state, wherein the graphical object in the third state includes text having a third an origin and a set of attributes, wherein the third origin includes one of hand written and machine generated, and the attributes include animation and at least one of text color, background color, stylized, vector format, bit mapped and transparency.

37. The method of claim 36, changing the state of the graphic object further comprises:

determining if the display pointer position is on the graphical object;

responsive to the display pointer moving on the graphical object, changing the state of the graphical object; and responsive to the display pointer moving off the graphical object, changing the state of the graphical object.

38. The method of claim 36, changing the state of the graphic object further comprises:

determining if the display pointer position is on the graphical object; and responsive to the display pointer position on the graphical object and responsive to a pointer device movement, changing the state of the graphical object.

* * * * *